Jan. 13, 1948.  J. A. WILSON ET AL  2,434,531
HIGH-SPEED RECORDING SYSTEM
Filed April 21, 1944
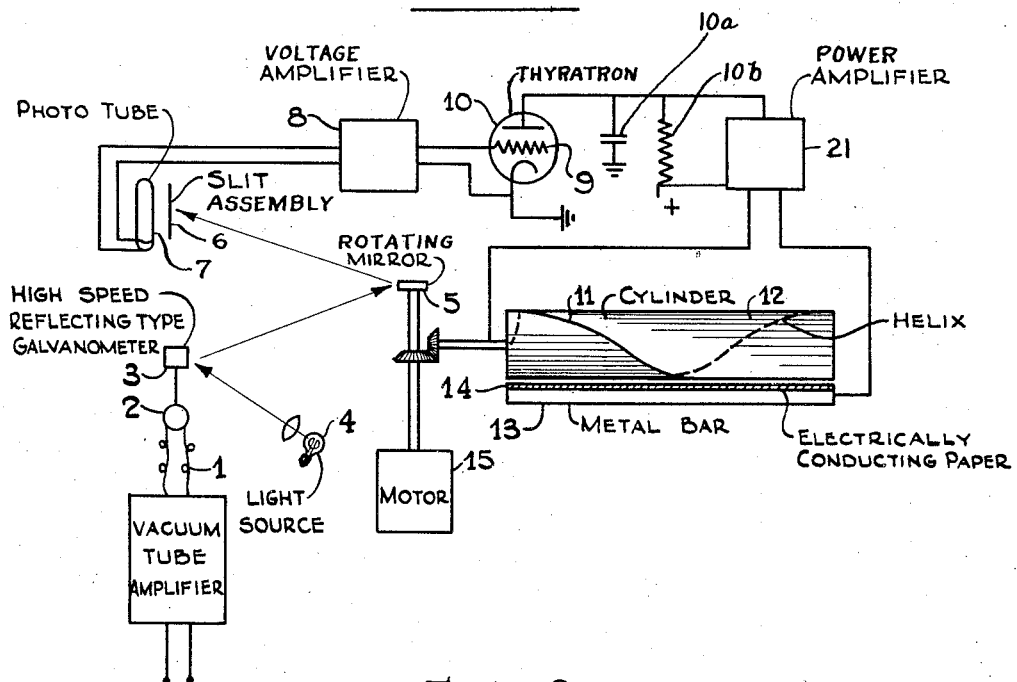
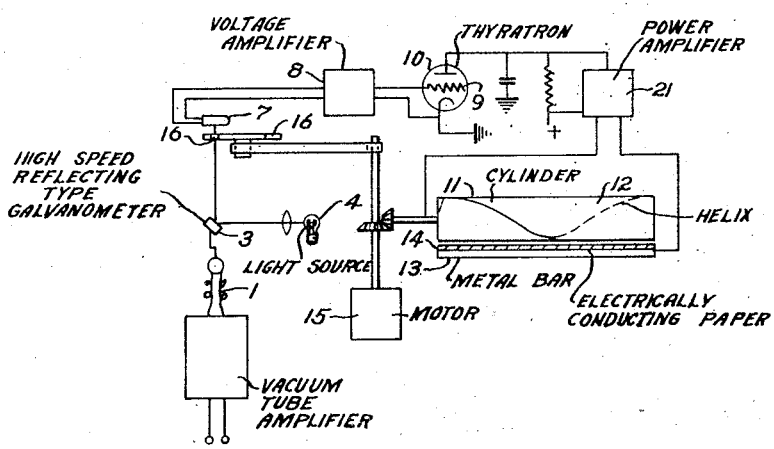
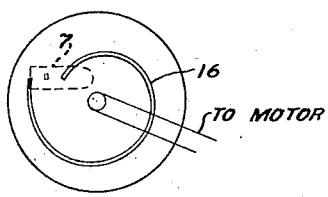
James A. Wilson
John J. Heigl   Inventors Patented Jan. 13, 1948

2,434,531

UNITED STATES PATENT OFFICE 2,434,531

HIGH-SPEED RECORDING SYSTEM

James A. Wilson, Linden, and John J. Heigl, Cranford, N. J., assignors to Standard Oil Development Company, a corporation of Delaware Application April 21, 1944, Serial No. 532,196

3 Claims. (Cl. 234—1.5)

This invention relates to apparatus for automatically recording electrical impulses and more particularly relates to apparatus for instantaneously recording extremely small voltages or currents as a function of some energy change.

The invention finds utility in a recording pyrometer in measuring voltage changes of thermocouples, photoelectric cells, and the like, exposed to variations in temperature or radiant energy.

The invention also finds utility in determining variations of electroytic conditions of industrial solutions, particularly in the determination of pH values of solutions wherein it is desirable to measure accurately and automatically small voltage changes.

In one of its more important modifications the invention finds utility in the measurement of electrical impulses produced as a function of a moving beam of light, for example, that produced by a mirror moving in response to small changes of pressure in a high pressure system, in response to changes in oxygen content of a gas as a function of magnetic susceptibility, or in response to deflection of pivoted elements such as caused by changes in gas density or weight, or in angular shift in refractometry.

In another of its modifications the invention finds utility in the measurement of small voltage changes produced as a function of changing wave lengths of light from the exit slit of a spectroscope.

In still another modification, the invention is useful in the measurement of no load or open circuit voltages of small magnitude, particularly where the internal resistance of the source is variable as in the case of thermocouples, etc.

Such small voltage changes have been recorded in the past by one of two means. One of the usual means is the conversion of electrical impulses to a beam of light which is focused on moving photographic paper. Another method comprises the use of a recording voltmeter wherein a pen is electrically energized to produce a mark or curve on a continuously moving paper. In the first case there is quite a time lag between the exposure of the plate to the light and its subsequent development, and in the second case the apparatus is quite expensive and complicated. Furthermore, in the use of an electrically energized pen consideration must be given for overcoming the inertia of the pen.

It is the main object of the present invention to provide a recording device which is simple, instantaneous and relatively cheap.

Other objects and a fuller understanding of this invention may be had by referring to the following description and claims taken in conjunction with the accompanying drawings in which like parts are designated by like reference characters and in which Figure 1 is a diagrammatic illustration of one embodiment of this invention employing a deflectible mirror type galvanometer.

Figure 2 is a diagrammatic illustration of another embodiment of this invention employing a spiral slit instead of a rotating mirror to deflect the light.

Figure 3 is a plan view of a spiral slit which may be used in place of the rotating mirror of Figure 1.

According to the present invention the current to be measured is converted into a striking potential which is impressed on the grid of a trigger fired peaking circuit to produce a sudden large sharp surge of anode current, which in turn produces a spark which passes through electrically conducting paper leaving a mark on the paper at the point of passage of the spark. By continuously changing the point at which the spark passes through the paper in response to changes in the voltage of the current to be measured, a continuous curve of the voltage changes is thus instantaneously recorded. In one embodiment of this invention, the striking potential is produced by breaking a light beam from a galvanometer mirror deflected in response to the changes in the current to be measured into an intermittent beam and impinging it onto a photocell. The intermittent current thus generated in the photo-cell is used to fire a thyratron tube which causes a sudden great sharp surge of current of high voltage to pass through the sensitive paper. According to another embodiment of this invention, a varying voltage of known quantity, varying linearly between a minimum and a maximum, is combined with the voltage to be measured to produce a striking potential which fires the thyratron tube. In each of these embodiments the point at which the spark passes through the electrically conductive paper is determined by the position of a rotating electrically conductive helix, the rotation of which is synchronized in one case with the means for breaking the light beam into an intermittent beam and in the other case with the means for continuously changing the linear voltage of the transient current which is added to the unknown voltage.

Referring now more specifically to Figure 1, a source of unknown current 1 is passed to galvanometer 2 which is provided with a deflecting mirror 3 which moves in response to the changing of the voltage of the current to be measured. A source of light 4 is reflected from mirror 3 onto rotating mirror 5 which reflects the light intermittently through slit 6 onto photo-cell 7. The intermittent current thus produced in photo-cell 7 is passed into tube amplifier 8 and imposed on grid 9 of thyratron tube 10. At each such impulse of positive potential, the grid 9 causes tube 10 to ionize. Condenser 10a in the normal or uncharged condition of tube 10 is charged to anode potential by means of source of "B" supply through resistor 10b. When the impulse of positive potential is impressed upon grid 9, tube 10 immediately discharges an impulse of current which flows through the anode-cathode circuit including amplifier 21, metal helix 11 wound on cylinder 12, metal bar 13 placed therebeneath, an electro-sensitive paper 14 placed therebetween, momentarily energizing the anode-cathode circuit and causing a spark to pass through the electro-sensitive paper 14, leaving a mark on the paper at the point of passage of the spark. At the same time, the discharge of the tube 10 causes the condenser 10a to discharge because of the low impedance of the anode-cathode circuit across its plates. The potential is thus removed from the anode of tube 10 allowing the tube to de-ionize and be ready for the next impulse of grid current. Upon removal of anode potential, condenser 10a is recharged through resistor 10b which is of such value as to recharge the condenser in a predetermined interval. Cylinder 12 is rotated by means of motor 15 which synchronizes the rotation of the cylinder with that of the rotating mirror 5. Thus the point at which helix 11 produces a mark on the electrically conducting paper 14 is determined by the position of rotating mirror 5 when a beam of light is flashed through slit 6, the effective position of the rotating mirror being determined in turn by the position of the deflecting mirror 3, the position of which in turn is determined by the voltage through galvanometer 2 at that particular time. Mirror 5 and cylinder 12 can be rotated by motor 15 at any desired speed. A speed which has been found useful is 600 R. P. M. The record printed upon paper 14 will be a series of dots the lateral position of which depends upon the time of each cycle of rotation of the photo-electric system that a spark passes from the helix 11 through the paper 14 to conducting bar 13.

Instead of oscillating mirror 5 and slit 6, a single assembly can be used as shown in Figures 2 and 3. This assembly consists of spiral slit 16 which is rotated by means of motor 15 in synchronization with the rotation of cylinder 12. In this manner the point at which the light beam reflected from the deflecting mirror 3 of the galvanometer 2 reaches photo tube 7 is determined by the position of slit 16. This in turn fixes the effective position of helix 11 as described above.

From the above description it is evident that a simple, convenient and rapid method for recording electrical impulses from any source has been described. It is obvious that the device employs only simple mechanical elements capable of rugged yet accurate construction and is relatively simple to operate in comparison with the usual intricate mechanical recording devices which are expensive and require extreme care.

Although the present invention has been described with a certain degree of particularity it is to be understood that the present disclosure has been made only by way of example and that numerous changes in the details of construction and the combination and arrangement of parts may be resorted to without departing from the spirit and scope of the invention as hereinafter claimed. For example, instead of using a thyratron or gas-filled tube, it is within the scope of this invention to use any type of trigger fired peaking circuit such as the well-known Eccles-Jordan trigger circuit or any of the trigger circuits described on pages 133–136 of the revised edition of Electronics, Engineering Manual (McGraw-Hill Book Company).

The nature and objects of the present invention having thus been set forth and specific embodiments of the same illustrated, what is claimed as new and useful and desired to be protected by Letters Patent is:

1. A device for producing an indication of the value of a voltage which comprises means for producing a beam of radiations, means for deflecting said beam of radiations, said means being responsive to the voltage the value of which is to be indicated, a rotating spiral slit in the path of said deflected beam of light adapted to break said beam of light into intermittent beams, means adapted to convert said intermittent light beams into intermittent electric impulses, a rotating voltage measuring means, means for impressing said impulses upon said voltage measuring means and means for synchronizing the rotation of said voltage measuring means with the rotation of said rotating slit so that the electric impulses are displaced across said rotating measuring means as a function of the voltage to be indicated.

2. A device for producing an indication of the value of a voltage which comprises a galvanometer provided with a deflecting mirror movable in response to the strength of the voltage, a source of light positioned so as to direct a beam of light onto said deflecting mirror and be reflected therefrom, a rotating spiral slit in the path of said reflected beam of light adapted to break said beam of light into intermittent beams, means adapted to convert said intermittent light beams into intermittent electric impulses, a rotating voltage measuring means, means for impressing said electric impulses upon said voltage measuring means, and means for synchronizing the rotation of said voltage measuring means with the rotation of said rotating slit so that the electric impulses are displaced across said rotating measuring means as a function of the voltage to be indicated.

3. A device for producing an indication of the value of a voltage which comprises a galvanometer provided with a deflecting mirror movable in response to the strength of the voltage, a source of light positioned so as to direct a beam of light onto said deflecting mirror and be reflected therefrom, a disc in the path of said beam of light, said disc having a spiral slit therein and rotating in its own plane and adapted to break said light beams into intermittent beams, means adapted to convert said intermittent light beams into intermittent electric impulses, a rotating voltage measuring means, means for impressing said impulses upon said voltage measuring means and means for synchronizing the rotation of said voltage measuring means with the rotation of said rotating slit so that the electric impulses are displaced across said rotating measuring means as a function of the voltage to be indicated.

JAMES A. WILSON.
JOHN J. HEIGL.

REFERENCES CITED

The following references are of record in the file of this patent:

UNITED STATES PATENTS

| Number | Name | Date |
|---|---|---|
| 1,850,909 | Bahney | Mar. 22, 1932 |
| 1,979,964 | Duffendack | Nov. 6, 1934 |
| 2,193,606 | Ulrey | Mar. 12, 1940 |
| 2,348,711 | Chappell | May 16, 1944 |
| 2,351,081 | Swift | June 13, 1944 |
| 2,215,806 | Young | Sept. 24, 1940 |
| 1,638,103 | Roucka | Aug. 9, 1927 |
| 2,230,502 | Pearson | Feb. 4, 1941 |
| 2,228,883 | Morgan | Jan. 14, 1941 |
| 2,388,105 | Wilson | Oct. 30, 1945 |
| 1,926,824 | Stogoff | Sept. 12, 1933 |

FOREIGN PATENTS

| Number | Country | Date |
|---|---|---|
| 764,846 | France | Mar. 12, 1934 |